C. E. ALLSHOUSE.
FRUIT AND NUT CATCHER.
APPLICATION FILED JUNE 7, 1920.

1,371,999. Patented Mar. 22, 1921.

Inventor:
Clarence E. Allshouse.
By Jones Rain Hinkle
Attys.

UNITED STATES PATENT OFFICE.

CLARENCE E. ALLSHOUSE, OF CHICAGO, ILLINOIS.

FRUIT AND NUT CATCHER.

1,371,999.     Specification of Letters Patent.     Patented Mar. 22, 1921.

Application filed June 7, 1920. Serial No. 387,196.

*To all whom it may concern:*

Be it known that I, CLARENCE E. ALLSHOUSE, a citizen of the United States, residing at Chicago, in the county of Cook and State of Illinois, have invented certain new and useful Improvements in Fruit and Nut Catchers, of which the following is a specification.

This invention relates to improvements in fruit and nut catchers.

One of the objects of the invention is to provide a yieldable, two part structure, connected by a pivoted joint at one end upon which they may be relatively moved to include the bole of a tree between the members and which jointly underlie the spreading branches of the tree.

Another object is to provide a double frame, consisting of two members pivoted together at like ends and a yieldable, concave cover supported by each frame, each said cover having a central perforation through which nuts, or fruit that will drop upon the cover will pass into a receptacle therebelow.

Another object is to provide runners for the members upon which they are supported and upon which they may be hauled over the ground, under the trees.

Other, further and more specific objects of the invention will become readily apparent, to persons skilled in the art, from a consideration of the following description, when taken in conjunction with the drawings, wherein:—

In all of the views the same reference characters are employed to indicate similar parts.

The device is intended to be placed under trees and to underlie the spreading branches of the trees so that when the trees are shaken the nuts or fruit that may fall upon the device will be directed, as a result of the concave shape of the top of the structure, into an aperture near the bottom or lowest part of the cover.

It is also arranged in two members pivoted together, so that one member may be placed on one side of the bole of a tree while the other is on the opposite side and, in this manner, the entire surface under the spreading branches will be covered.

Each of the members 5 and 6 consists of a frame having side members 7 and 8 and end members 9 and 10 joined together so as to form a rectangular parallelogram. Both of the frame members are alike, therefore, only one will be described.

Figure 1:
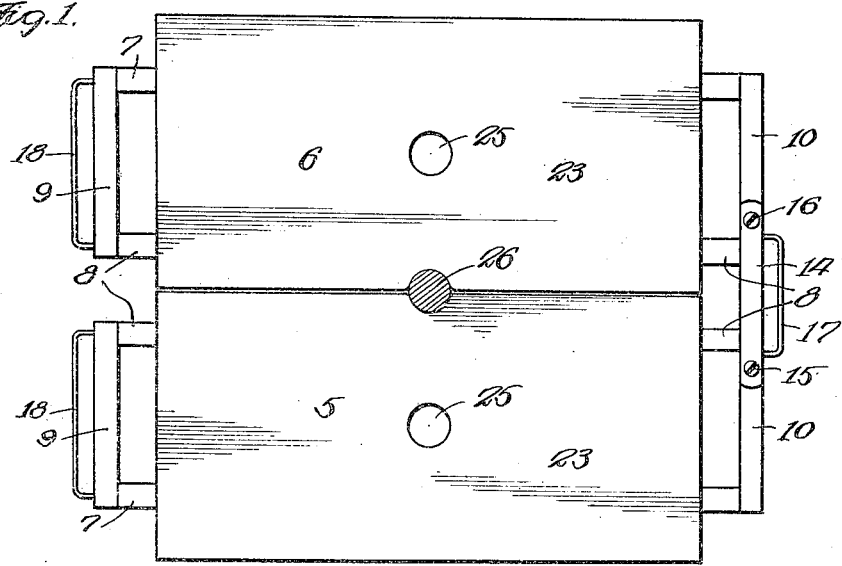
Figure 1 is a top plan view of the device in position for use.
Figure 2:
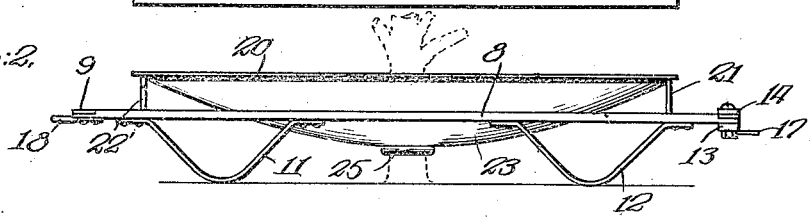
Fig. 2 is a side elevation thereof.
Figure 3:
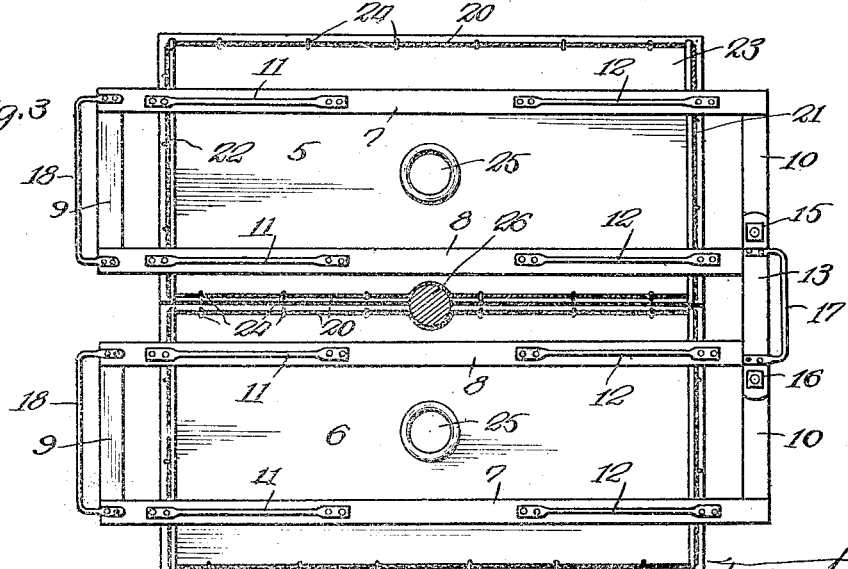
Fig. 3 is an inverted plan view.

Under each of the frames described, are two sets of runners 11 and 12, which support the frame members above the ground, from twenty-four to thirty inches. A link, consisting of two parallel bars 13 and 14, is pivoted to the end member 10, as at 15 and 16, and to this link is connected a handle 17, by which the device may be pulled over the ground. For the purpose of convenience another handle 18 is located on the rear end of each member. To the outstanding wire frame member 20 a fabric 23 is detachably secured at intervals, by hooks or the like, as at 24. The fabric 23 is rather loose and assumes a concave form as shown very clearly in Fig. 2, and near the center thereof is a perforation 25 through which the fruit or nuts will pass when dropping upon the receiving sheet, or fabric. To place the device around the tree, such as tree 26, the members are separated at their rear ends and subsequently brought together, until the tree 26 is inclosed as shown in Figs. 1 and 3.

Now, it will be apparent that if a basket, or other receptacle, is placed under the opening 25 and tree vigorously shaken, that the fruit or nuts from the tree will drop upon the cover 23 and roll through the perforation 25, or may easily be swept through the perforation by the hand, or by other means. After the fruit has been gathered from one tree, the members 5 and 6 are pressed apart and pulled over the ground to the next tree, whereupon they are once more placed in the relative position shown in Figs. 1 and 3, in regard to the next tree, and so on, until all of the fruit or nuts of an orchard has thus been gathered. The covers 23 of the members being preferably of fabric and not closely overlying and unyielding material such as the wooden frame, the fruit dropping upon the cover will not be bruised.

The device may be taken apart and stored in small compass and the covers 23 may be conveniently removed for cleaning or repairs.

Having described my invention what I claim as new and desire to secure by Letters Patent is:—

1. A fruit and nut catcher comprising two frame members hinged together at one end at adjacent edges; connecting means attached to the hinge to draw the structure over the ground, and a yieldable cover carried by each frame and supported thereabove.

2. A fruit and nut catcher comprising two frame members hinged together at one end, runners supporting the members, a yieldable cover carried by each frame and supported thereabove, each cover having a hole near its central zone, and a handle connected to one of the hinge members.

3. A fruit and nut catcher comprising two rectangular frame members hinged together at one end; a yieldable cover carried by each frame member and supported thereabove, each cover having a hole near its central zone and runners supporting each said member.

4. A fruit and nut catcher comprising two rectangular frame members hinged together at one end; a yieldable fabric cover carried by each frame member and sufficiently loose to bag in the center, supported above the frame members, each cover having a hole in the lower part of the bagging portion and a pair of runners, supporting each end of each member.

5. A fruit and nut catcher comprising two like rectangular frames hinged together at one end; a bagging fabric cover overlying each frame and supported thereabove, said covers each being perforated near its central zone; a wire frame extending outwardly and upwardly from the rectangular frame for supporting each cover; a handle at the pivoted end of the structure and a handle on the rear end of each rectangular frame.

In testimony whereof I hereunto subscribed my name.

CLARENCE E. ALLSHOUSE.